US011925971B2

(12) United States Patent
Strutt

(10) Patent No.: US 11,925,971 B2
(45) Date of Patent: Mar. 12, 2024

(54) COMPONENT WITH STRUCTURED PANEL(S) AND METHODS FOR FORMING THE COMPONENT

(71) Applicant: Rohr, Inc., Chula Vista, CA (US)

(72) Inventor: Andrew J. Strutt, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 123 days.

(21) Appl. No.: 17/472,024

(22) Filed: Sep. 10, 2021

(65) Prior Publication Data

US 2023/0079677 A1  Mar. 16, 2023

(51) Int. Cl.
| | |
|---|---|
| B23K 1/00 | (2006.01) |
| B21J 5/02 | (2006.01) |
| B21J 13/02 | (2006.01) |
| B32B 3/26 | (2006.01) |
| B32B 15/01 | (2006.01) |
| B21K 7/12 | (2006.01) |

(52) U.S. Cl.
CPC ............. *B21J 5/022* (2013.01); *B21J 13/02* (2013.01); *B23K 1/0008* (2013.01); *B32B 3/266* (2013.01); *B32B 15/01* (2013.01); *B21K 7/12* (2013.01)

(58) Field of Classification Search
CPC ......... B21J 5/022; B21J 13/02; B23K 1/0008; B23K 3/087; B32B 3/266; B32B 15/01; B21K 7/12; B64F 5/00; B23P 2700/01; E04C 2/08; E04C 2/384; E04C 2/422; B21D 47/00; G10K 11/172; F02C 7/28
See application file for complete search history.

(56) References Cited

U.S. PATENT DOCUMENTS

| | | | |
|---|---|---|---|
| 5,140,913 A | 8/1992 | Takeichi | |
| 5,239,823 A * | 8/1993 | Sims | F02K 1/822 |
| | | | 239/265.17 |
| 5,680,934 A | 10/1997 | Jaegers | |
| 6,180,932 B1 | 1/2001 | Matsen | |
| 6,199,742 B1 | 3/2001 | Good | |
| 6,241,184 B1 | 6/2001 | Sunne | |
| 7,785,098 B1 | 8/2010 | Appleby | |
| 8,042,315 B2 | 10/2011 | Ashton | |
| 8,707,747 B1 * | 4/2014 | Norris | B21D 47/00 |
| | | | 428/116 |
| 9,114,587 B2 | 8/2015 | Lewis | |
| 9,206,309 B2 | 12/2015 | Appleby | |
| 9,908,283 B2 | 3/2018 | Young | |
| 10,507,931 B2 | 12/2019 | Soria | |

(Continued)

FOREIGN PATENT DOCUMENTS

CN    112519329 A    3/2021

OTHER PUBLICATIONS

EP search report for EP22195231.0 dated Apr. 19, 2023.

(Continued)

*Primary Examiner* — Lee A Holly
(74) *Attorney, Agent, or Firm* — Getz Balich LLC

(57) ABSTRACT

A manufacturing method is provided during which a plurality of first apertures are formed in a first plate to provide an apertured first plate. The apertured first plate is configured from or otherwise includes first plate metal. A first sheet is bonded to the apertured first plate to form a first grid structure. The first apertures extend through the apertured first plate to the first sheet. The first sheet is configured from or otherwise includes first sheet metal.

20 Claims, 9 Drawing Sheets

(56) References Cited

U.S. PATENT DOCUMENTS

2014/0102108 A1* 4/2014 Kramer .................... F02C 7/28
                                                    60/770
2015/0041059 A1   2/2015 Olson
2020/0017189 A1* 1/2020 Kruckenberg ....... G10K 11/172

OTHER PUBLICATIONS

Shi Shanahan et al. "Flexural Strength and Energy Absorption of Carbon-Fiber-Aluminum-Honeycomb Composite Sandwich Reinforced by Aluminum", Thin-Walled Structures, vol. 84, Aug. 13, 2014, pp. 416-422.
Partial EP search report for EP22195231.0 dated Dec. 22, 2022.

* cited by examiner

COMPONENT WITH STRUCTURED PANEL(S) AND METHODS FOR FORMING THE COMPONENT

BACKGROUND

1. Technical Field

This disclosure relates generally to a component with one or more structured panels.

2. Background Information

A component for an aircraft may be configured with an orthogrid structure or an isogrid structure. Various types of orthogrid and isogrid structures and method for manufacturing such structures are known in the art. While these known structures and manufacturing methods have various advantages, there is still room in the art for improvement. For example, a typical orthogrid or isogrid structure is formed by milling away pockets in a billet of material. Such a milling process can be time consuming and expensive.

SUMMARY OF THE DISCLOSURE

According to an aspect of the present disclosure, a manufacturing method is provided during which a plurality of first apertures are formed in a first plate to provide an apertured first plate. The apertured first plate is configured from or otherwise includes first plate metal. A first sheet is bonded to the apertured first plate to form a first grid structure. The first apertures extend through the apertured first plate to the first sheet. The first sheet is configured from or otherwise includes first sheet metal.

According to another aspect of the present disclosure, another manufacturing method is provided during which an assembly of component elements is disposed within a cavity of a base die. The cavity projects vertically into the base die to a cavity bottom surface. The cavity extends laterally within the base die to a cavity first side surface that is angularly offset from the cavity bottom surface by an obtuse angle. A first interior die is arranged with the assembly of component elements. The first interior die pushes against the assembly of component elements to clamp the assembly of component elements laterally between the cavity first side surface and the first interior die and vertically between the cavity bottom surface and the first interior die. The assembly of component elements are brazed together, while clamped between the first interior die and the base die, to form a component that is configured as or otherwise includes a first grid structure.

According to still another aspect of the present disclosure, an apparatus is provided which includes a first orthogrid structure, a second orthogrid structure and a fitting. The first orthogrid structure includes an apertured first plate bonded to a non-apertured first sheet. A plurality of first apertures extend through the apertured first plate to the non-apertured first sheet. The second orthogrid structure includes an apertured second plate bonded to a non-apertured second sheet. A plurality of second apertures extend through the apertured second plate to the non-apertured second sheet. The fitting is between and is bonded to the first orthogrid structure and the second orthogrid structure. The first orthogrid structure, the second orthogrid structure and the fitting are each configured from or otherwise include metal.

The bonding may include brazing the first sheet to the apertured first plate.

The forming may include machining the first apertures into the first plate.

The method may also include: arranging bonding material between the apertured first plate and the first sheet to provide a stack; and pressing the stack between a first die and a second die during the bonding.

The method may also include bonding a fitting to the apertured first plate and/or the first sheet concurrently with the bonding of the first sheet to the apertured first plate.

The fitting may include a base and a flange. The apertured first plate may be abutted against an end of the flange. The first sheet may be abutted against a side of the flange and an end of the base.

The method may also include: providing an apertured second plate and a second sheet, where the apertured second plate includes a plurality of second apertures; and bonding the second sheet to the apertured second plate to form a second grid structure, where the second apertures extends through the apertured second plate to the second sheet. The second sheet may be bonded to the apertured second plate concurrently with the bonding of the first sheet to the apertured first plate.

The method may also include bonding the fitting to the apertured second plate and/or the second sheet concurrently with the bonding of the second sheet to the apertured second plate.

The first grid structure may be angularly offset from the second grid structure.

The first grid structure may be configured as or otherwise include an orthogrid structure.

A first of the first apertures may have a polygonal cross-sectional geometry.

The first grid structure may include a base and a plurality of stiffening ribs connected to and projecting out from the base. The base may be formed by the first sheet. The stiffening ribs may be arranged in an interconnected network that is formed by the apertured first plate.

The first plate metal may be the same as the first sheet metal.

The first plate metal and/or the first sheet metal may be configured from or otherwise include a nickel-based alloy.

The first plate metal and/or the first sheet metal may be configured from or otherwise include a titanium-based alloy.

The first grid structure may be configured as or otherwise include an orthogrid structure.

The component may also include a second grid structure and a first corner fitting. The first grid structure may be disposed against the cavity bottom surface. The second grid structure may be disposed against the cavity first side surface. The first corner fitting may be disposed at a corner between the cavity bottom surface and the cavity first side surface.

The method may also include: arranging a second interior die with the assembly of component elements, where the cavity extends laterally within the base die between the cavity first side surface and a cavity second side surface, and where the cavity second side surface is angularly offset from the cavity bottom surface by an obtuse angle; and pushing the second interior die against the assembly of component elements to clamp the assembly of component elements laterally between the cavity second side surface and the second interior die and vertically between the cavity bottom surface and the second interior die. The component may also include a third grid structure and a second corner fitting. The third grid structure may be disposed against the cavity second side surface. The second corner fitting may be disposed at a corner between the cavity bottom surface and the cavity second side surface.

The method may also include arranging a wedge between the first interior die and the second interior die to: push the first interior die laterally and vertically against the assembly of component elements; and/or push the second interior die laterally and vertically against the assembly of component elements.

The method may also include machining a plurality of first apertures into a first plate to provide an apertured first plate. The assembly of component elements may include the apertured first plate and a first sheet. The first grid structure may include the apertured first plate and the first sheet bonded to the apertured first plate. Each of the first apertures may extend through the apertured first plate to the first sheet.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
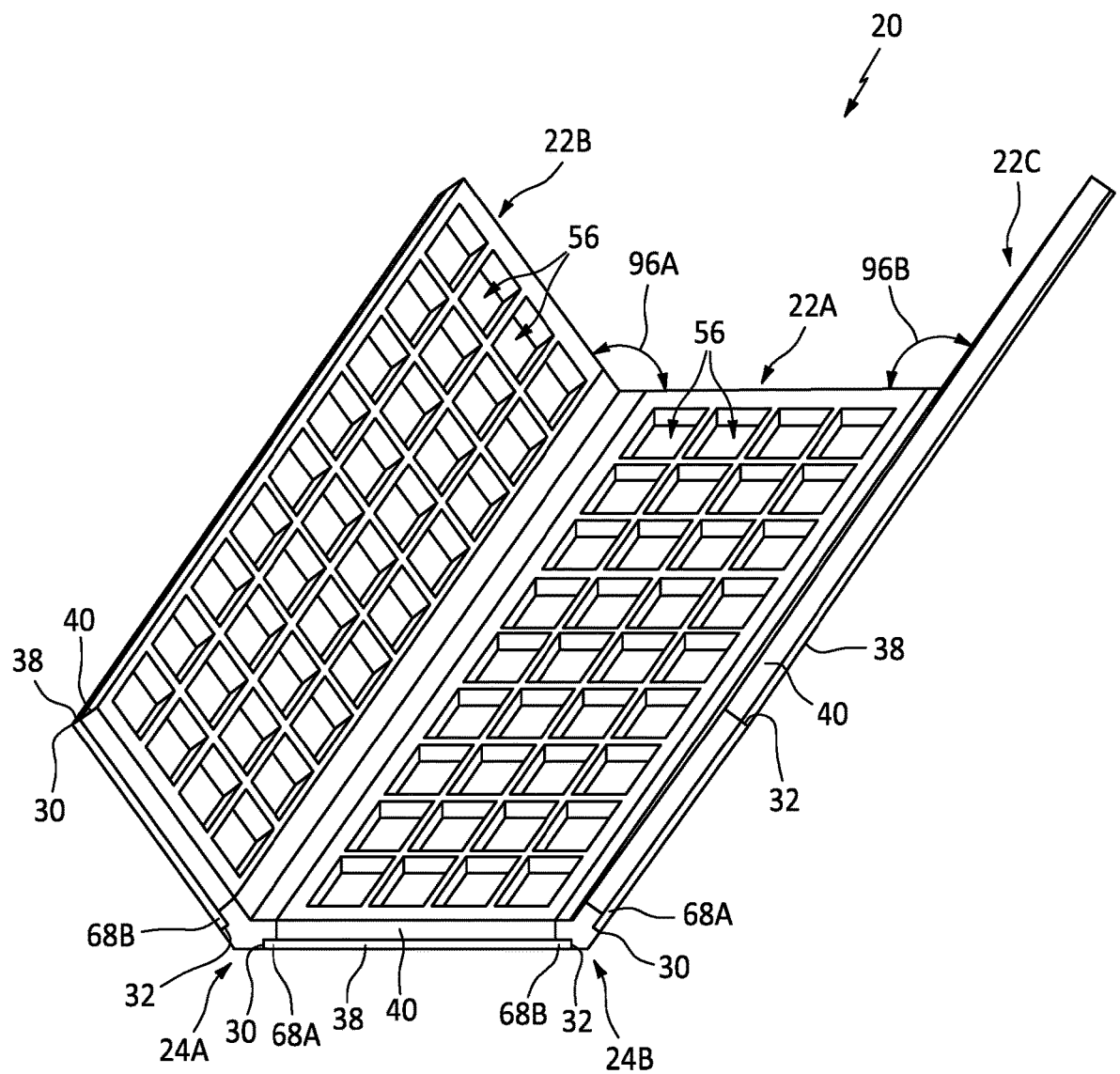
FIG. 1 is a perspective illustration of a component.

FIG. 1 illustrates a component 20 for a structural component of an aircraft. The component 20, for example, may be configured as a part of an aircraft propulsion system, an aircraft fuselage, an aircraft wing, an aircraft pylon, an aircraft tail section, etc. Examples of the aircraft include, but are not limited to, an airplane, a helicopter, a drone, a rocket, or any other device which travels through air and/or space. The present disclosure, however, is not limited to aircraft applications.

The component 20 of FIG. 1 includes a plurality of component panels 22A-C (generally referred to as "22"). The component 20 of FIG. 1 also includes one or more component fittings 24A and 24B (generally referred to as "24") for respectively interconnecting the component panels 22 together.

Figure 2:
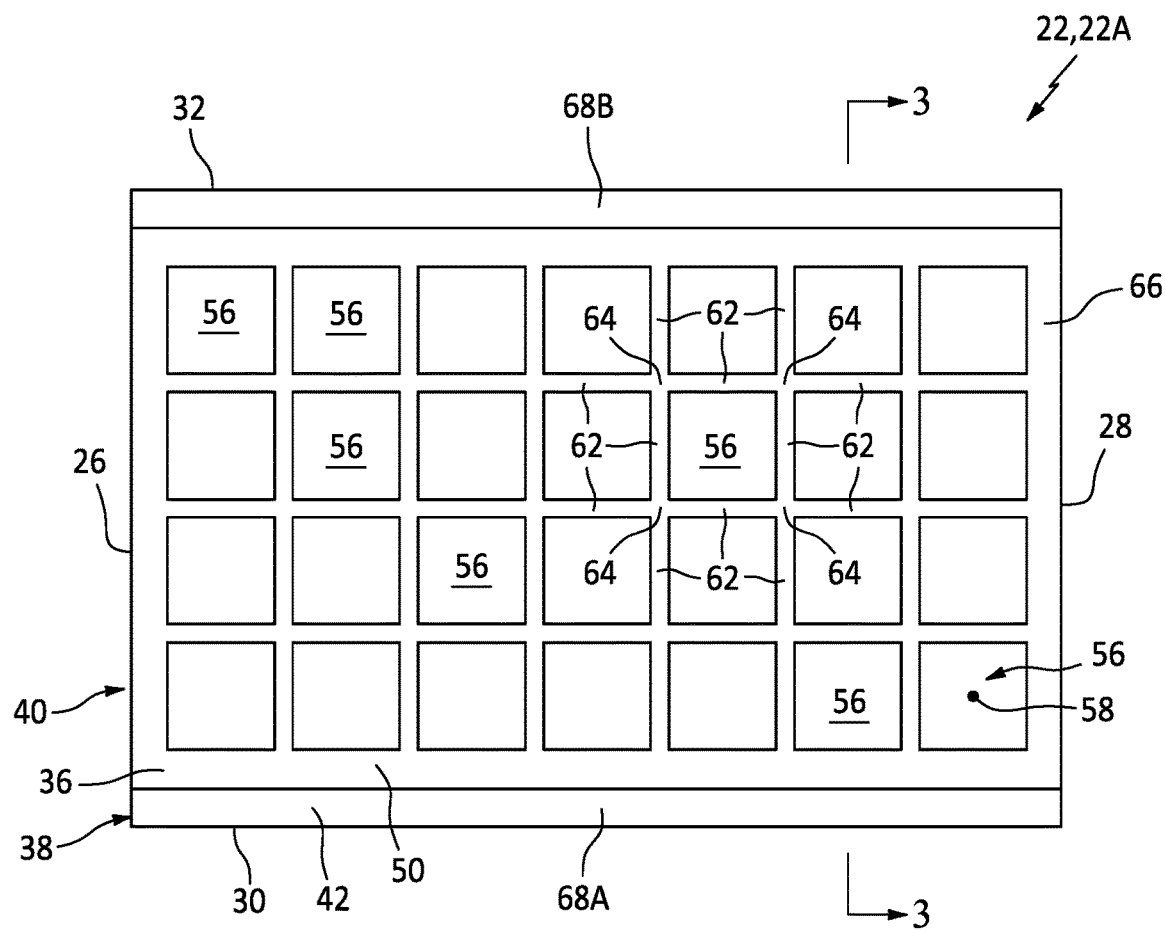
FIG. 2 is an illustration of a component panel.
Figure 3:
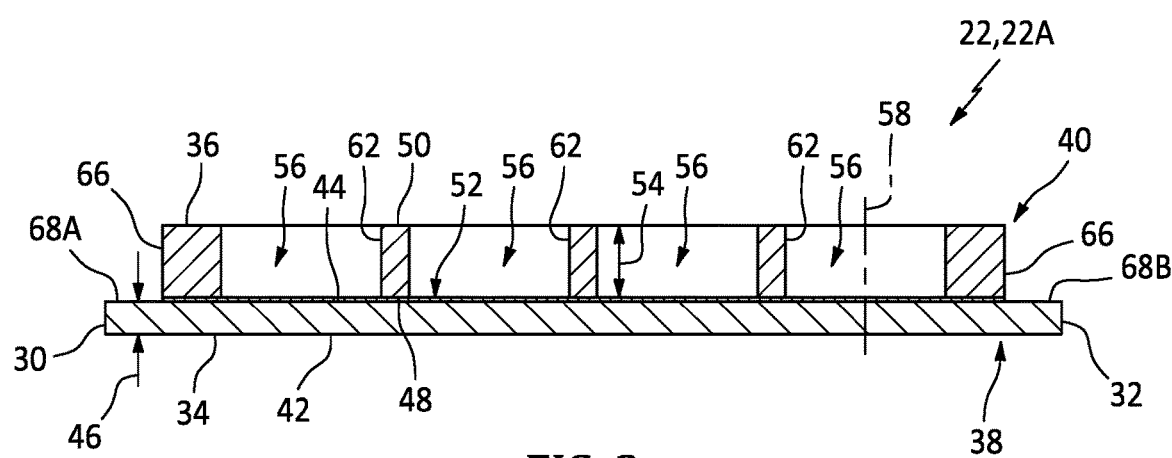
FIG. 3 is a sectional illustration of the component panel taken along line 3-3 in FIG. 2.

Referring to FIG. 2, each component panel 22 extends longitudinally between and to a longitudinal first end 26 of the respective component panel 22 and a longitudinal second end 28 of the respective component panel 22. Each component panel 22 extends laterally between and to a lateral first end 30 of the respective component panel 22 and a lateral second end 32 of the respective component panel 22. Referring to FIG. 3, each component panel 22 extends vertically between and to a vertical first side 34 of the respective component panel 22 and a vertical second side 36 of the respective component panel 22.

Each component panel 22 of FIGS. 2 and 3 is configured as a structural/structured panel. Each component panel 22, for example, may be configured as or otherwise include an orthogrid structure. The present disclosure, however, is not limited to such an exemplary component panel configuration. The component panel 22, for example, may alternatively be configured as or otherwise include an isogrid structure or any other type of grid structure.

Each component panel 22 may have a multi-layered construction. Each component panel 22 of FIGS. 2 and 3, for example, includes a solid, non-apertured sheet 38 and an apertured plate 40.

The non-apertured sheet 38 is disposed at the panel first side 34. The non-apertured sheet 38 of FIGS. 2 and 3 forms a skin of the respective component panel 22. The non-apertured sheet 38 may be constructed from a solid, non-apertured sheet of material; e.g., sheet metal. The non-apertured sheet material may be metal such as, but not limited to, nickel (Ni), titanium (Ti), or an alloy thereof.

Referring to FIG. 2, the non-apertured sheet 38 extends longitudinally between and to (or about) the longitudinal first end 26 of the respective component panel 22 and the longitudinal second end 28 of the respective component panel 22. The non-apertured sheet 38 extends laterally between and to (or about) the lateral first end 30 of the respective component panel 22 and the lateral second end 32 of the respective component panel 22. Referring to FIG. 3, the non-apertured sheet 38 extends vertically between and to opposing vertical side surfaces 42 and 44 of the non-apertured sheet 38, where the first side surface 42 of the non-apertured sheet 38 is disposed at the panel first side 34.

The non-apertured sheet 38 has a vertical thickness 46. This vertical thickness 46 extends from the first side surface 42 of the non-apertured sheet 38 to the second side surface 44 of the non-apertured sheet 38.

The apertured plate 40 is disposed at the panel second side 36. The apertured plate 40 of FIGS. 2 and 3 forms a reinforcement and/or support structure for the panel skin. The apertured plate 40 may be constructed from an apertured sheet of material; e.g., sheet metal or metal plate. The apertured plate material may be metal such as, but not limited to, nickel (Ni), titanium (Ti), or an alloy thereof. The apertured plate material may be the same as the non-apertured sheet material.

Referring to FIG. 2, the apertured plate 40 extends longitudinally between and to (or about) the longitudinal first end 26 of the respective component panel 22 and the longitudinal second end 28 of the respective component panel 22. The apertured plate 40 extends laterally between and to (or about) the lateral first end 30 of the respective component panel 22 and the lateral second end 32 of the respective component panel 22. Referring to FIG. 3, the apertured plate 40 extends vertically between and to opposing vertical side surfaces 48 and 50 of the apertured plate 40, where the second side surface 50 of the apertured plate 40 is disposed at the panel second side 36. The first side surface 48 of the apertured plate 40 is abutted vertically against and engages the second side surface 44 of the non-apertured sheet 38. The apertured plate 40 of FIG. 3, for example, is bonded to the non-apertured sheet 38 by bonding material 52; e.g., braze material.

The apertured plate 40 has a vertical thickness 54. This vertical thickness 54 extends from the first side surface 48 of the apertured plate 40 to the second side surface 50 of the apertured plate 40. The vertical thickness 54 of FIG. 3 is sized differently (e.g., greater) than the vertical thickness 46 of the non-apertured sheet 38. The present disclosure, however, is not limited to such an exemplary dimensional relationship.

The apertured plate 40 includes a plurality of apertures 56; e.g., ports, windows, etc. These apertures 56 may be configured as through-apertures relative to the apertured plate 40, and as blind-apertures relative to the respective component panel 22. Each of the apertures 56, for example, extends along a respective aperture centerline 58 vertically through the apertured plate 40 between and to the first side surface 48 and the second side surface 50 of the apertured plate 40. Each aperture 56 of FIG. 3 thereby projects vertically into the respective component panel 22 from the panel second side 36, through the apertured plate 40, to the non-apertured sheet 38 and its second side surface 44 (and/or the bonding material 52 over the second side surface 44).

Figure 4A:
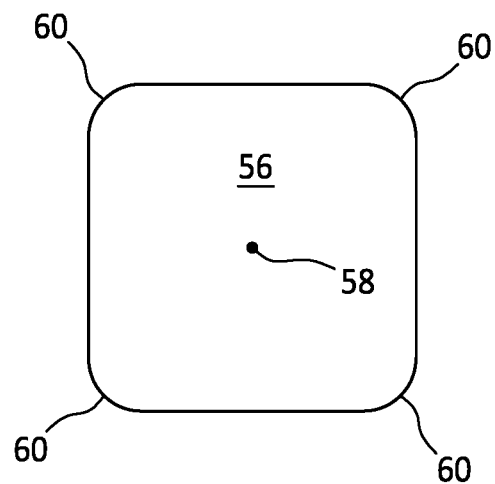
FIGS. 4A and 4B are schematic illustrations of various aperture configurations for the component panel.
Figure 4B:
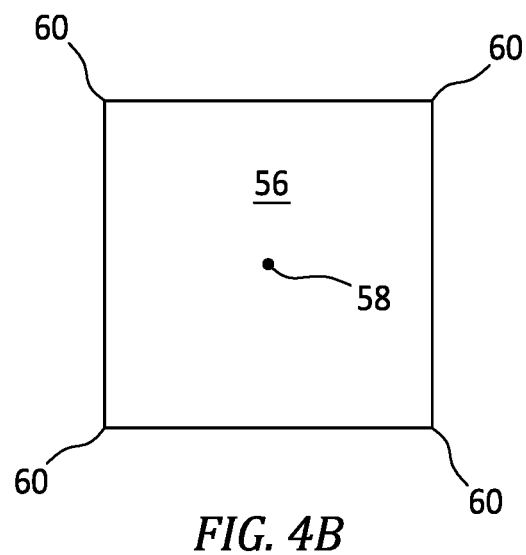

Referring to FIG. 2, each of the apertures 56 has a cross-sectional geometry when viewed, for example, in a plane perpendicular to its aperture centerline 58 and/or a plane parallel with one or more of the surfaces 42, 44, 48 and/or 50 (see also FIG. 3). The cross-sectional geometry may be a polygonal cross-sectional geometry; e.g., a rectangular cross-sectional geometry, a diamond-shaped cross-sectional geometry, a triangular cross-sectional geometry, etc. Referring to FIG. 4A, one or more or all of corners 60 of the polygonal cross-sectional geometry may be eased; e.g., rounded. Referring to FIG. 4B, one or more or all of the corners 60 of the polygonal sectional geometry may alternatively (or also) be sharp; e.g., pointed, squared-off.

Referring to FIG. 2, the apertures 56 are arranged in an array. This array may have a rectangular pattern with one or more laterally extending rows and one or more longitudinally extending columns. The present disclosure, however, is not limited to such an exemplary pattern.

With the foregoing arrangement, the respective component panel 22 is configured with an interconnected network (e.g., truss, structure, etc.) of stiffening ribs 62. An outer peripheral boundary of each aperture 56 is formed by a grouping of the stiffening ribs 62; e.g., a subset of the stiffening ribs 62. Each of the stiffening ribs 62 extends within a plane of the apertured plate 40 between opposing ends thereof, where at least one or both of these ends is located at a respective node 64 (e.g., interconnection) with one or more other stiffening ribs 62. Referring to FIG. 3, each of the stiffening ribs 62 is bonded (e.g., brazed) to the non-apertured sheet 38 at its second side surface 44. Each of the stiffening ribs 62 of FIG. 3 projects vertically out from the non-apertured sheet 38 and its second side surface 44 to the second side surface 50 of the apertured plate 40 and/or the panel second side 36.

Referring to FIG. 2, the respective component panel 22 may also be configured with a frame 66; e.g., a border. This frame 66 may extend at least partially or completely about an outer periphery of the interconnected network of the stiffening ribs 62. Referring to FIG. 3, the frame 66 may also or alternatively be bonded (e.g., brazed) to the non-apertured sheet 38 at its second side surface 44. The frame 66 of FIG. 3 projects vertically out from the non-apertured sheet 38 and its second side surface 44 to the second side surface 50 of the apertured plate 40 and/or the panel second side 36.

For ease of description, the component panels 22 are generally described above with respect to illustrations of the intermediate component panel 22A in FIGS. 2 and 3. This intermediate component panel 22A of FIGS. 2 and 3 includes a plurality of lateral flanges 68A and 68B (generally referred to as "68") at and longitudinally along each lateral end 30, 32. One of these lateral flanges 68, by contrast, may be omitted from each side component panel 22B, 22C as shown, for example, in FIG. 1.

Figure 5:
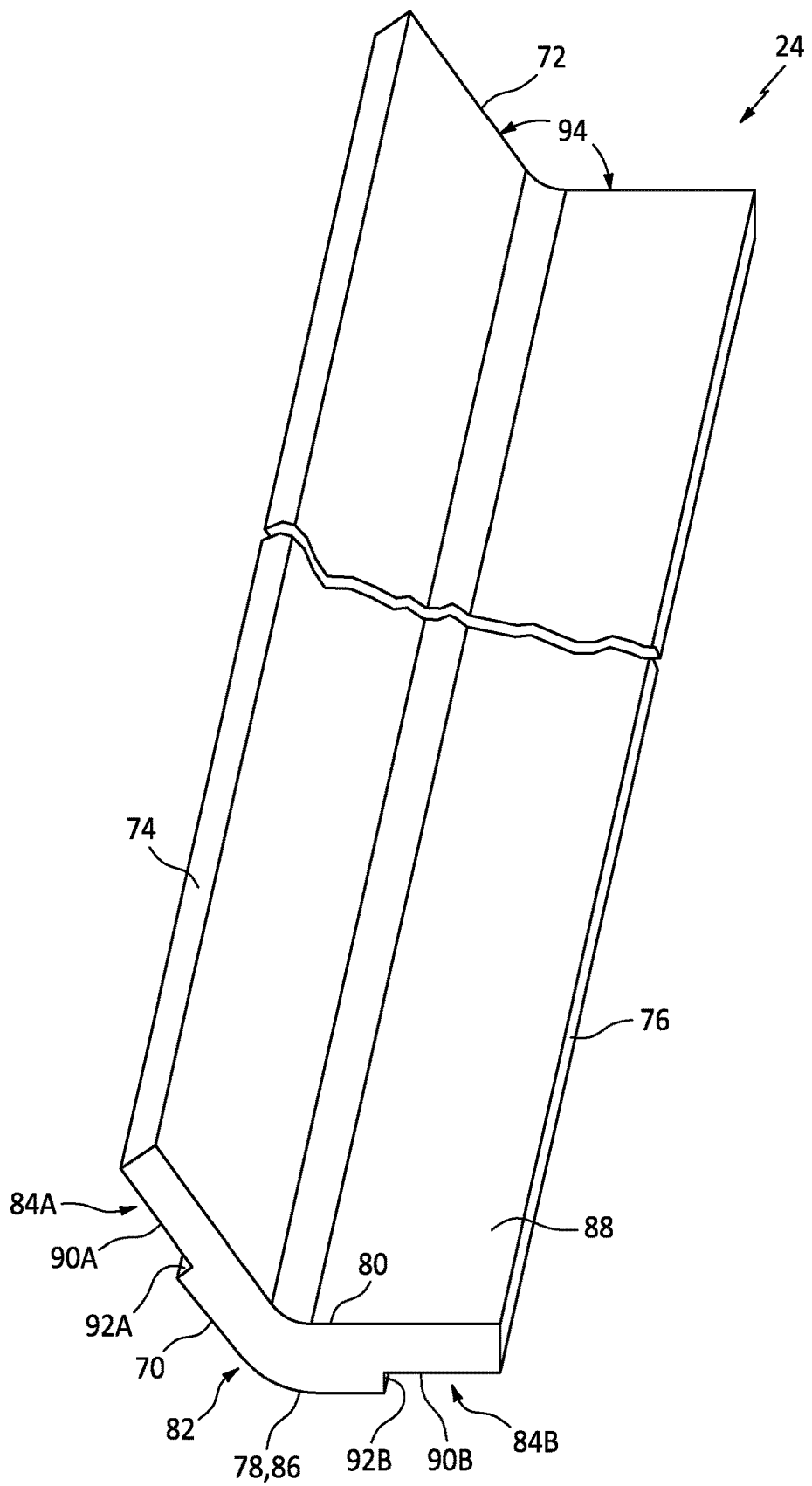
FIG. 5 is a perspective illustration of a component fitting.

Each component fitting 24 of FIG. 1 is configured as a corner fitting for connecting a respective set of the component panels 22 (e.g., laterally) together. Referring to FIG. 5, each component fitting 24 extends longitudinally between a longitudinal first end 70 of the respective component fitting 24 and a longitudinal second end 72 of the respective component fitting 24. Each component fitting 24 extends laterally between a lateral first end 74 of the respective component fitting 24 and a lateral second end 76 of the respective component fitting 24. Each component fitting 24 extends vertically between a vertical first side 78 of the respective component fitting 24 and a vertical second side 80 of the respective component fitting 24.

Each component fitting 24 of FIG. 5 includes a fitting base 82 and one or more fitting flanges 84A and 84B (generally referred to as "84"). The fitting base 82 is located laterally between and connected to (e.g., formed integral with or otherwise attached to) the first flange 84A and the second flange 84B. The fitting base 82 extends longitudinally between and to the longitudinal first end 70 of the respective component fitting 24 and the longitudinal second end 72 of the respective component fitting 24. The fitting base 82 extends vertically between and to a (e.g., convex) first side surface 86 of the respective component fitting 24 and a (e.g., concave) second side surface 88 of the respective component fitting 24. The first side surface 86 is disposed at the fitting first side 78, and the second side surface 88 is disposed at the fitting second side 80.

The first flange 84A extends longitudinally between and to the longitudinal first end 70 of the respective component fitting 24 and the longitudinal second end 72 of the respective component fitting 24. The first flange 84A projects laterally out from the fitting base 82 to the lateral first end 74 of the respective component fitting 24. The first flange 84A extends vertically between and to a first flange surface 90A (e.g., a shelf) of the first flange 84A and the second side surface 88 of the respective component fitting 24. The first flange surface 90A is vertically recessed (e.g., displaced) inward from the first side surface 86 of the respective component fitting 24, thereby forming a first shoulder 92A extending vertically from the first flange surface 90A to the first side surface 86 of the respective component fitting 24.

The second flange 84B extends longitudinally between and to the longitudinal first end 70 of the respective component fitting 24 and the longitudinal second end 72 of the respective component fitting 24. The second flange 84B projects laterally out from the fitting base 82 to the lateral second end 76 of the respective component fitting 24. The second flange 84B extends vertically between and to a second flange surface 90B (e.g., a shelf) of the second flange 84B and the second side surface 88 of the respective component fitting 24. The second flange surface 90B is vertically recessed (e.g., displaced) inward from the first side surface 86 of the respective component fitting 24, thereby forming a second shoulder 92B extending vertically from the second flange surface 90B to the first side surface 86 of the respective component fitting 24.

The second flange 84B of FIG. 5 is angularly offset from the first flange 84A by an included angle 94. This included angle 94 may be an obtuse angle. The included angle 94, for example, may be greater than ninety degrees (>90°) and less than one-hundred and eighty degrees (<180°); e.g., between ninety-five degrees (95°) and one-hundred and twenty degrees (120°), or between one-hundred and twenty degrees (120°) and one-hundred and fifty degrees (150°), or between one-hundred and fifty degrees (150°) and one-hundred and seventy-five degrees (175°). The present disclosure, however, is not limited to such an exemplary arrangement.

Figure 6:
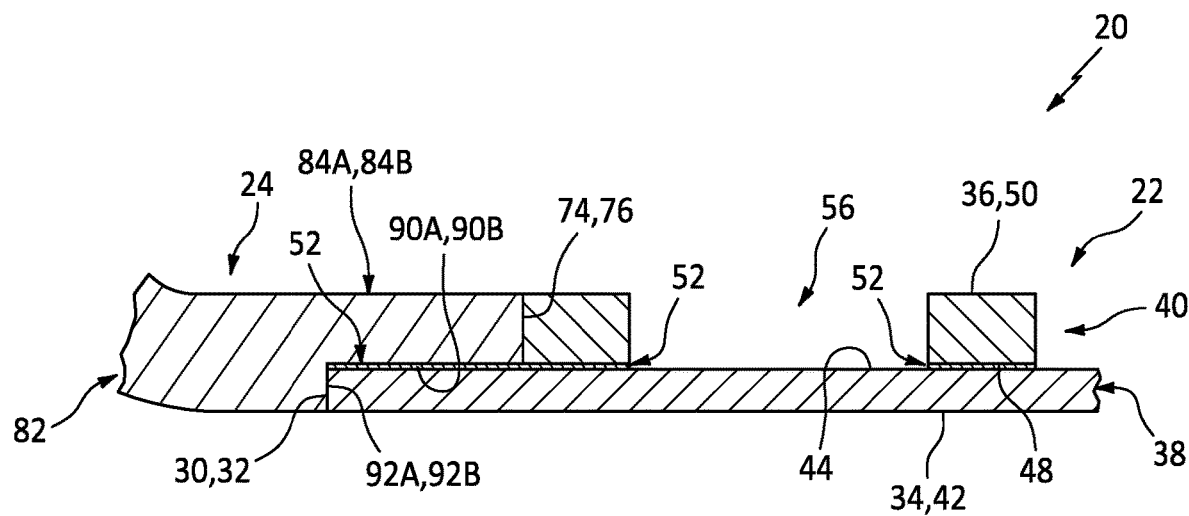
FIG. 6 is a sectional illustration of a portion of the component at an interface between the component panel and the component fitting.

Referring to FIG. 1, each component fitting 24 is arranged (e.g., laterally) between a respective set (e.g., pair) of the component panels 22 and neighboring lateral ends 30 and 32. Referring to FIG. 6, the non-apertured sheet 38 of a respective component panel 22 is mated with a notch in a respective component fitting 24. More particularly, the non-apertured sheet 38 laterally overlaps the respective flange surface 90A, 90B and is laterally abutted against the respective shoulder 92A, 92B. The non-apertured sheet 38 may thereby laterally engage the fitting base 82 and vertically engage the respective flange 84A, 84B. The apertured plate 40 is laterally abutted against the respective lateral end 74, 76. The apertured plate 40 may thereby laterally engage the respective flange 84A, 84B.

Each component fitting 24 is bonded (e.g., brazed) to the respective component panels 22. The non-apertured sheet 38, for example, may be bonded (e.g., brazed) to the respective flange 84A, 84B and/or the fitting base 82 via the bonding material 52. The apertured plate 40 may also or alternatively be bonded (e.g., brazed) to the respective flange 84A, 84B via, for example, the bonding material 52.

With the arrangement of FIG. 1, the intermediate component panel 22A is angularly offset from the first side component panel 22B by an included angle 96A. This included angle 96A may be an obtuse angle. The included angle 96A, for example, may be greater than ninety degrees) (>90° and less than one-hundred and eighty degrees)(<180°; e.g., between ninety-five degrees (95°) and one-hundred and twenty degrees (120°), or between one-hundred and twenty degrees (120°) and one-hundred and fifty degrees (150°), or between one-hundred and fifty degrees (150°) and one-hundred and seventy-five degrees (175°). The present disclosure, however, is not limited to such an exemplary arrangement.

The intermediate component panel 22A is angularly offset from the second side component panel 22C by an included angle 96B, which may be equal to or different than the included angle 96A. This included angle 96B may be an obtuse angle. The included angle 96B, for example, may be greater than ninety degrees)(>90° and less than one-hundred and eighty degrees)(<180°; e.g., between ninety-five degrees (95°) and one-hundred and twenty degrees (120°), or between one-hundred and twenty degrees (120°) and one-hundred and fifty degrees (150°), or between one-hundred and fifty degrees (150°) and one-hundred and seventy-five degrees (175°). The present disclosure, however, is not limited to such an exemplary arrangement.

Figure 7:
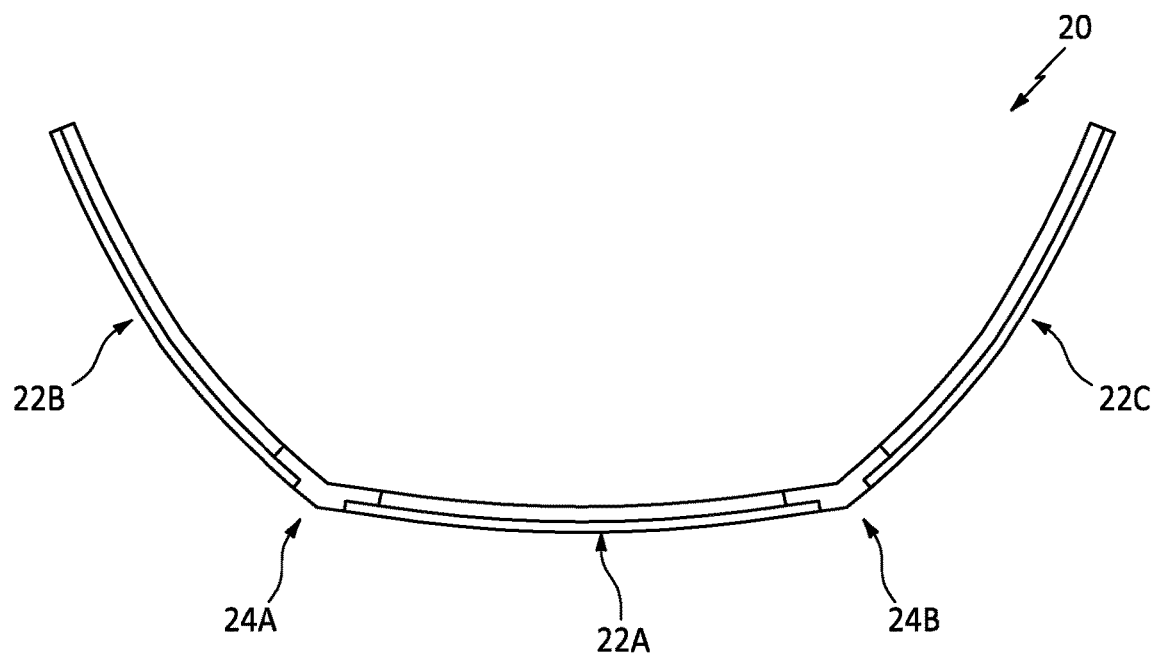
FIG. 7 is an illustration of the component with non-flat component panels.

In some embodiments, each of the component panels 22 may be flat. In other embodiments, referring to FIG. 7, any one or more of the component panels 22 may be non-flat; e.g., curved. While the component panels 22 are shown as being curved in a lateral-vertical plane in FIG. 7, one or more of the component panels 22 may also or alternatively be curved or otherwise non-flat in a longitudinal vertical plane and/or a lateral-longitudinal plane. The component 20 of the present disclosure therefore is not limited to the exemplary arrangements of FIGS. 1 and 7.

Figure 8:
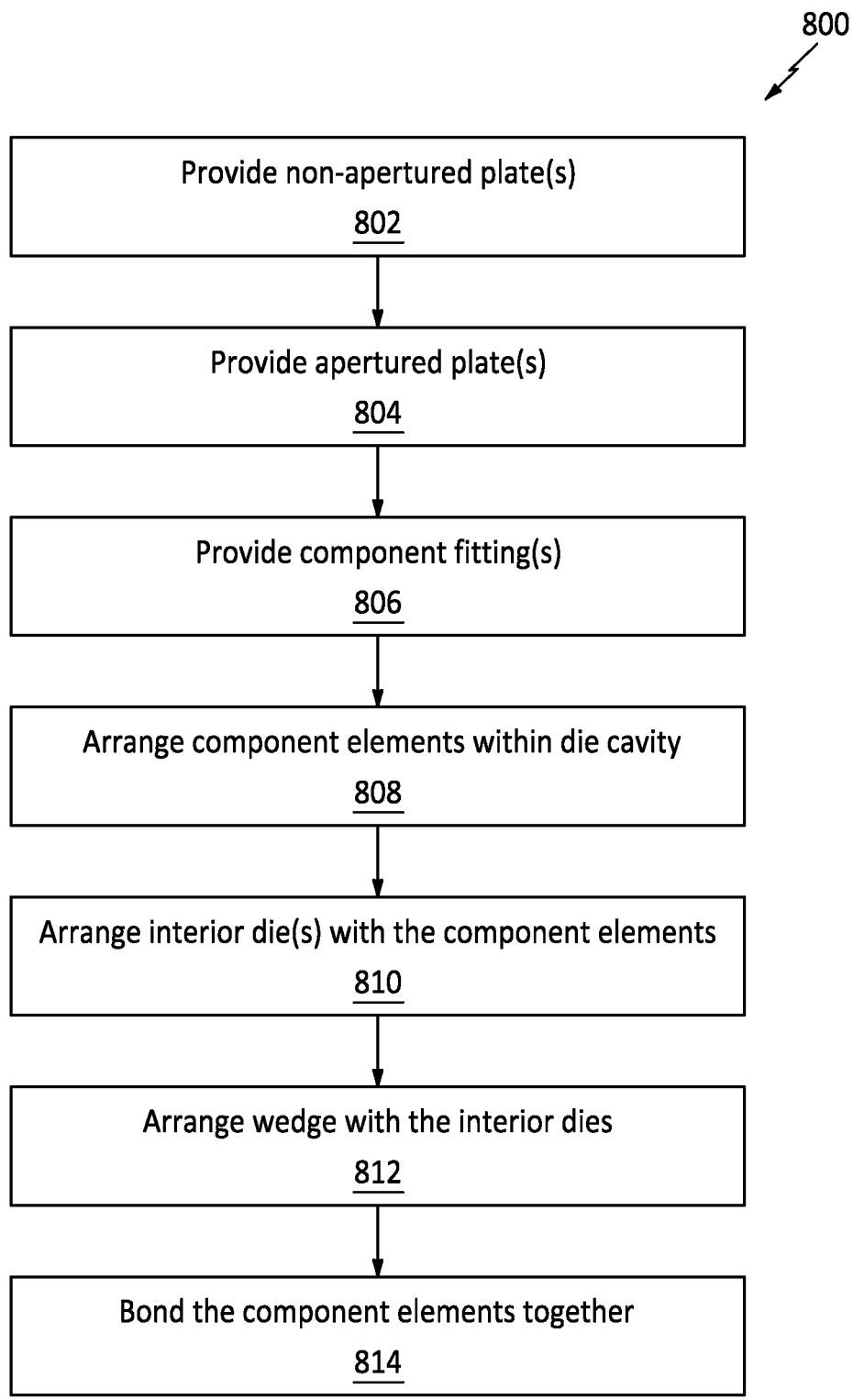
FIG. 8 is a flow diagram of a method for manufacturing a component.

FIG. 8 is a flow diagram of a method 800 for manufacturing a component. For ease of description, this component is described below with reference to the component 20 described above. The method 800 of the present disclosure, however, is not limited to manufacturing such an exemplary component.

Figure 9:
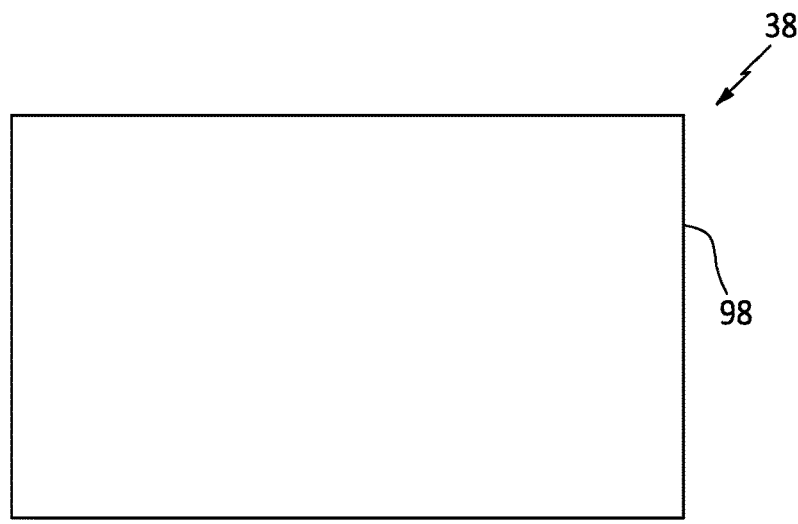
FIG. 9 is an illustration of a non-apertured sheet.

In step 802, one or more non-apertured sheets 38 are provided. For example, referring to FIG. 9, a sheet of material 98 (e.g., sheet metal) may be cut (e.g., trimmed) to size to provide a respective non-apertured sheet 38. Alternatively, one or more of the non-apertured sheets 38 may be cast, machined and/or otherwise formed.

Figure 10A:
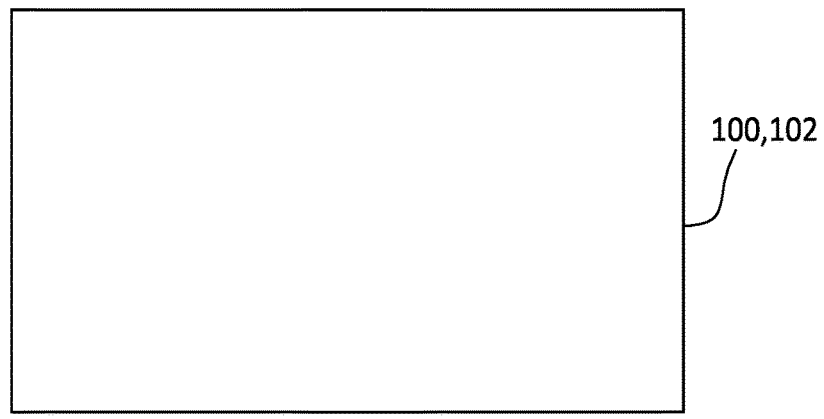
FIGS. 10A and 10B illustrate a sequence for forming an apertured plate.

In step 804, one or more apertured plates 40 are provided. For example, referring to FIG. 10A, a sheet of material 100 (e.g., sheet metal or metal plate) may be cut (e.g., trimmed) to size to provide a base plate 102; e.g., non-apertured plate. Alternatively, the base plate may be cast, machined and/or otherwise formed.

Figure 10B:
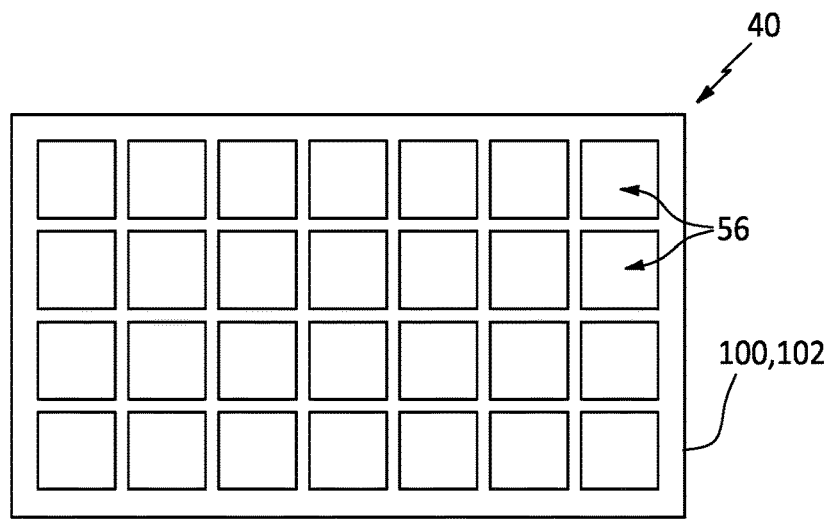

Referring to FIG. 10B, the apertures 56 are formed in the base plate 102 to provide a respective apertured plate 40. The apertures 56, for example, may be machined (e.g., cut) into the base plate 102 using one or more machining tools. Examples of the machining tools include, but are not limited to, a water jet machining device, an energy (e.g., laser or electron) beam machining device and a machining mill. Alternatively, the apertured plate 40 may be cast and/or otherwise formed.

In step 806, one or more component fittings 24 are provided. The component fitting 24 of FIG. 5, for example, may be cast, machined, extruded and/or otherwise formed.

Figure 11:
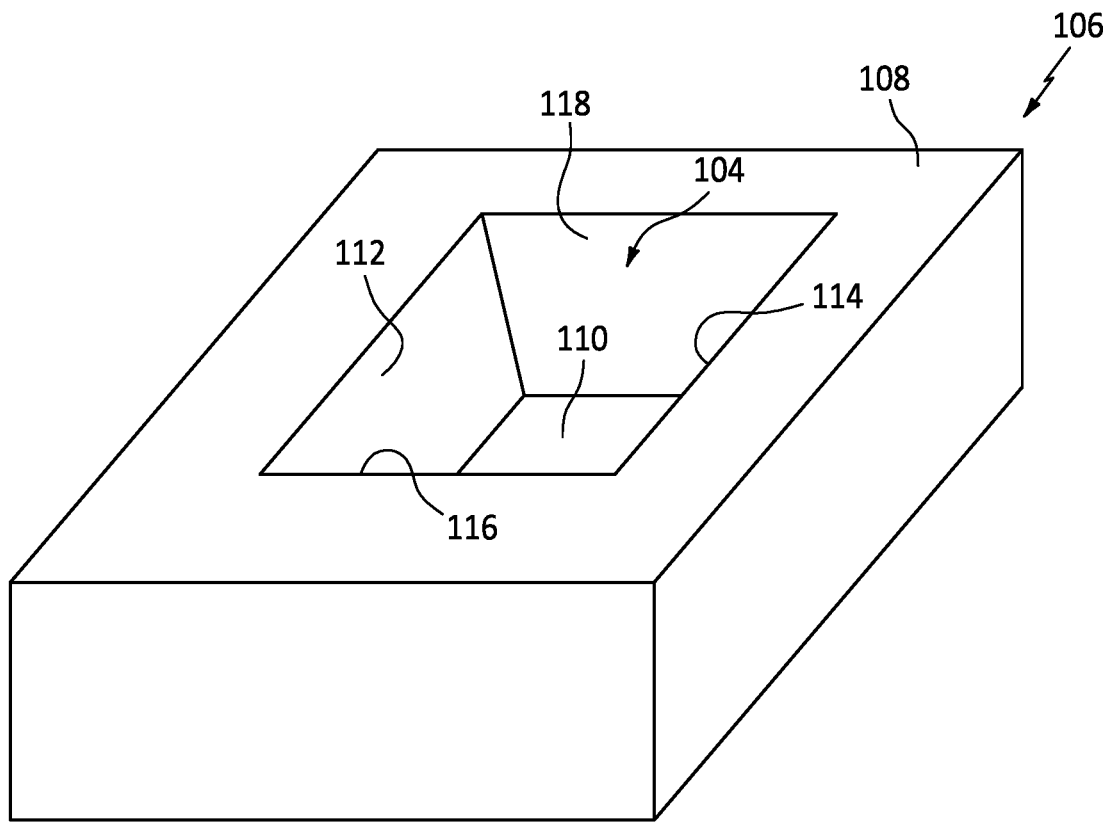
FIG. 11 is a perspective illustration of a base die.
Figure 12:
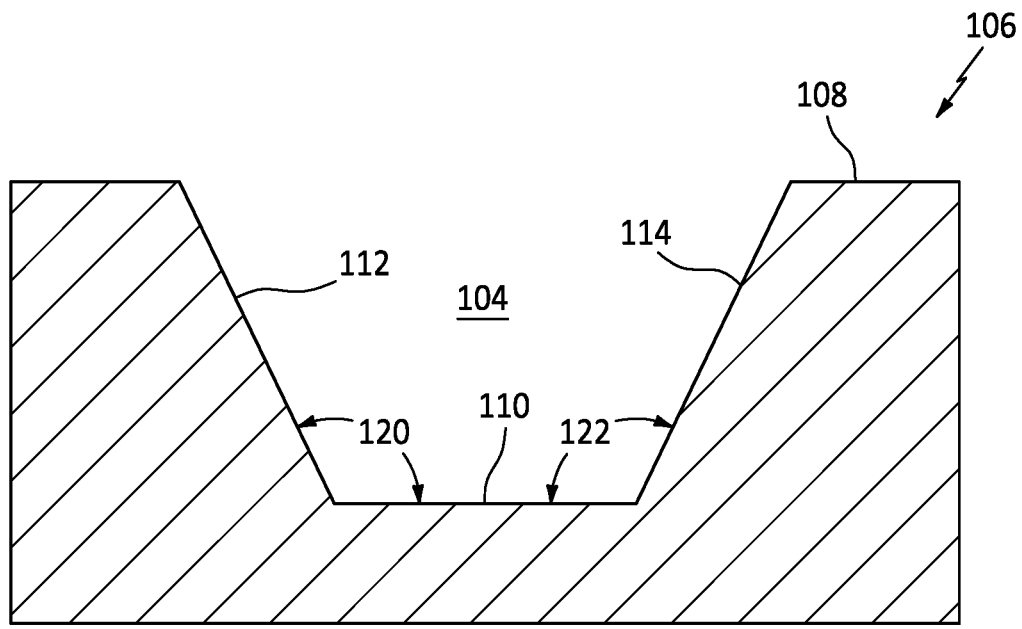
FIG. 12 is a sectional illustration of the base die.

In step 808, the component elements 24, 38, 40 and 52 are arranged within a cavity 104 of a base die 106. Referring to FIG. 11, the die cavity 104 projects vertically into the base die 106 from an exterior surface 108 of the base die 106 to a cavity bottom surface 110 of the base die 106 (see also FIGS. 3 and 6). The die cavity 104 extends laterally within the base die 106 between and to opposing cavity side surfaces 112 and 114 of the base die 106. The die cavity 104 extends longitudinally within the base die 106 between and to opposing cavity end surfaces 116 and 118 of the base die 106. Referring to FIG. 12, the cavity first side surface 112 is angularly offset from the cavity bottom surface 110 by an included angle 120, which included angle 120 may be equal to an included angle of a corresponding portion of the component to be formed; e.g., see the included angle 96A of FIG. 1. The cavity second side surface 114 is angularly offset from the cavity bottom surface 110 by an included angle 122, which included angle 122 may be equal to an included angle of a corresponding portion of the component to be formed; e.g., see the included angle 96B of FIG. 1.

Figure 13:
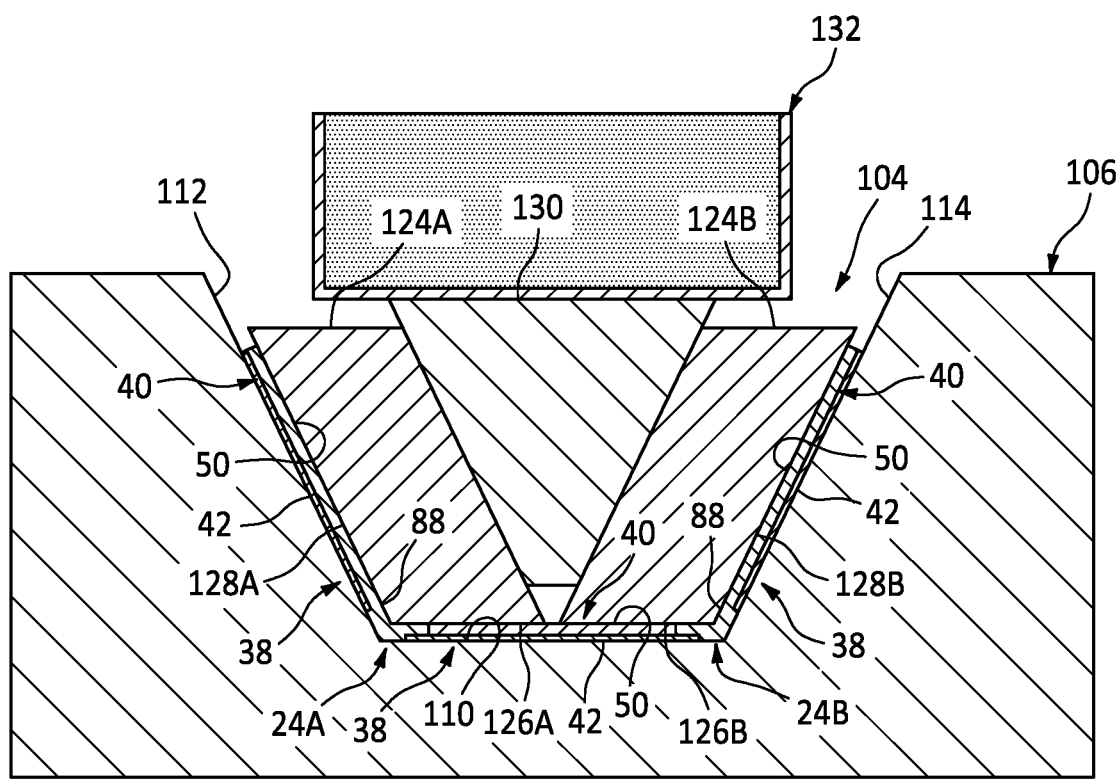
FIG. 13 is a sectional illustration of an assembly of component elements arranged within a die assembly for bonding the component.

Referring to FIG. 13, each of the non-apertured sheets 38 is arranged with a respective one of the cavity surfaces 110, 112, 114. Each non-apertured sheet 38 and its first side surface 42, for example, may be laid (e.g., flat) against the respective cavity surface 110, 112, 114. Bonding material 52 (see FIGS. 3 and 6; e.g., a brazing foil) is arranged with each of the non-apertured sheets 38. The bonding material 52, for example, may be laid (e.g., flat) against each respective non-apertured sheet 38 and its second side surface 44; see FIGS. 3 and 6. Each of the component fittings 24 is arranged at a respective corner of the die cavity 104. Each component fitting 24 may thereby be located laterally between and abutted against a laterally neighboring (e.g., adjacent) pair of the non-apertured sheets 38. Each of the apertured plates 40 is arranged with a respective one of the non-apertured sheets 38. Each apertured plate 40, for example, may be laid (e.g., flat) against each respective non-apertured sheet 38 such that, for example, the bonding material 52 is vertically between and engaged with (e.g., contacts) the second side surface 44 and the first side surface 48; see FIGS. 3 and 6. Each component fitting 24 may also be located laterally between and abutted against a laterally neighboring (e.g., adjacent) pair of the apertured plates 40.

In step 810, one or more interior dies 124A and 124B (generally referred to as "124") are arranged with the assembly of component elements 24, 38, 40 and 52 (see also FIGS. 3 and 6). For example, the first side interior die 124A of FIG. 13 may be abutted (e.g., lay flat) against the assembly of component elements 24, 38, 40 and 52 at a first side of the die cavity 104. The second side interior die 124B may be abutted (e.g., lay flat) against the assembly of component elements 24, 38, 40 and 52 at a second side of the die cavity 104. A bottom surface 126A, 126B of each interior die 124A, 124B may vertically engage (e.g., contact) the second side surface 50 of a respective apertured plate 40 and a portion of the second side surface 88 of a respective component fitting 24. An outer side surface 128A, 128B of each interior die 124A, 124B may laterally (and vertically) engage (e.g., contact) the second side surface 50 of a respective apertured plate 40 and another (e.g., remaining) portion of the second side surface 88 of a respective component fitting 24.

In step 812, at least one wedge 130 is arranged with the interior dies 124. For example, the wedge 130 of FIG. 13 may be disposed laterally between the interior dies 124. This wedge 130 is configured to push the interior dies 124 vertically downward (in view of FIG. 13) and laterally outward as the wedge 130 moves vertically downward towards the cavity bottom surface 110. A stack of the component elements 24, 38, 40 and 52 may thereby be pressed (e.g., clamped) laterally (and vertically) between the first side interior die 124A and the cavity first side surface 112. A stack of the component elements 24, 38, 40 and 52 may be pressed (e.g., clamped) laterally (and vertically) between the second side interior die 124B and the cavity second side surface 114. A stack of the component elements 24, 38, 40 and 52 may be pressed (e.g., clamped) vertically between the interior dies 124 and the cavity bottom surface 110. The base die 106 and the interior dies 124 may thereby facilitate (e.g., full) contact between the assembly of component elements 24, 38, 40 and 52 for bonding.

In some embodiments, static weight of the interior dies 124 and the wedge 130 may be suitable to apply enough pressure to the assembly of components 24, 38, 40 and 52 for the bonding. However, in other embodiments, the wedge 130 may be pushed downward using another device. For example, an additional static weight 132 (e.g., a container of metal particles; e.g., tungsten pellets) may be placed on top of the wedge 130. The present disclosure, however, is not limited to such an exemplary device.

In step 814, the assembly of component elements 24, 38, 40 and 52 is concurrently bonded together to form the component 20. The assembly of components 24, 38, 40 and 52 while pressed between the dies 106 and 124, for example, may be exposed to an elevated temperature during a furnace cycle. This elevated temperature may melt the bonding material 52. Upon cooling, the bonding material 52 may bond the various component elements 24, 38 and 40 together to provide the component 20. An example of such a bonding process is a diffusion bonding process. The present disclosure, however, is not limited to such an exemplary bonding process and could alternatively be a brazing process.

The component 20 is described above as including component fittings 24 (e.g., corner fittings) between neighboring component panels 22. This provides the component 20 with a channeled (e.g., box-like) configuration.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A manufacturing method, comprising:
   forming a plurality of first apertures in a first plate to provide an apertured first plate, the apertured first plate comprising first plate metal; and
   bonding a first sheet to the apertured first plate to form a first grid structure, the plurality of first apertures extending through the apertured first plate to the first sheet, and the first sheet comprising first sheet metal;
   wherein the apertured first plate has a plate vertical thickness, and the first sheet has a sheet vertical thickness which is smaller than the plate vertical thickness.

2. The manufacturing method of claim 1, further comprising:
   bonding a fitting to at least one of the apertured first plate or the first sheet;
   wherein the fitting includes a base and a flange;
   wherein the apertured first plate is abutted against an end of the flange; and
   wherein the first sheet is abutted against a side of the flange and an end of the base.

3. The manufacturing method of claim 2, wherein the fitting is bonded to the at least one of the apertured first plate or the first sheet during the bonding of the first sheet to the apertured first plate.

4. The manufacturing method of claim 1, further comprising:
   providing an apertured second plate and a second sheet, the apertured second plate comprising a plurality of second apertures; and
   bonding the second sheet to the apertured second plate to form a second grid structure, the plurality of second apertures extending through the apertured second plate to the second sheet.

5. The manufacturing method of claim 4, wherein the second sheet is bonded to the apertured second plate during the bonding of the first sheet to the apertured first plate.

6. The manufacturing method of claim 1, wherein the bonding comprises brazing the first sheet to the apertured first plate.

7. The manufacturing method of claim 1, wherein the forming comprises machining the plurality of first apertures into the first plate.

8. The manufacturing method of claim 1, further comprising:
   arranging bonding material between the apertured first plate and the first sheet to provide a stack; and
   pressing the stack between a first die and a second die during the bonding.

9. The manufacturing method of claim 1, wherein
the first grid structure comprises a base and a plurality of stiffening ribs connected to and projecting out from the base;
the base is formed by the first sheet; and
the plurality of stiffening ribs are arranged in an interconnected network that is formed by the apertured first plate.

10. A manufacturing method, comprising:
forming a plurality of first apertures in a first plate to provide an apertured first plate, the apertured first plate comprising first plate metal;
bonding a first sheet to the apertured first plate to form a first grid structure, the plurality of first apertures extending through the apertured first plate to the first sheet, and the first sheet comprising first sheet metal; and
bonding a fitting to at least one of the apertured first plate or the first sheet concurrently with the bonding of the first sheet to the apertured first plate;
wherein the fitting comprises a base and a flange;
wherein the apertured first plate is abutted against an end of the flange; and
wherein the first sheet is abutted against a side of the flange and an end of the base.

11. The manufacturing method of claim 10, wherein the bonding comprises brazing the first sheet to the apertured first plate.

12. The manufacturing method of claim 10, wherein the forming comprises machining the plurality of first apertures into the first plate.

13. The manufacturing method of claim 10, further comprising:
arranging bonding material between the apertured first plate and the first sheet to provide a stack; and
pressing the stack between a first die and a second die during the bonding.

14. The manufacturing method of claim 10, wherein the first grid structure comprises an orthogrid structure.

15. The manufacturing method of claim 10, wherein a first of the plurality of first apertures comprises a polygonal cross-sectional geometry.

16. The manufacturing method of claim 10, wherein
the first grid structure comprises a base and a plurality of stiffening ribs connected to and projecting out from the base;
the base is formed by the first sheet; and
the plurality of stiffening ribs are arranged in an interconnected network that is formed by the apertured first plate.

17. The manufacturing method of claim 10, wherein at least one of the first plate metal or the first sheet metal comprises a nickel-based alloy.

18. A manufacturing method, comprising:
forming a plurality of first apertures in a first plate to provide an apertured first plate, the apertured first plate comprising first plate metal;
bonding a first sheet to the apertured first plate to form a first grid structure, the plurality of first apertures extending through the apertured first plate to the first sheet, and the first sheet comprising first sheet metal;
bonding a fitting to at least one of the apertured first plate or the first sheet concurrently with the bonding of the first sheet to the apertured first plate;
providing an apertured second plate and a second sheet, the apertured second plate comprising a plurality of second apertures; and
bonding the second sheet to the apertured second plate to form a second grid structure, the plurality of second apertures extending through the apertured second plate to the second sheet;
wherein the second sheet is bonded to the apertured second plate concurrently with the bonding of the first sheet to the apertured first plate.

19. The manufacturing method of claim 18, further comprising bonding the fitting to at least one of the apertured second plate or the second sheet concurrently with the bonding of the second sheet to the apertured second plate.

20. The manufacturing method of claim 18, wherein the first grid structure is angularly offset from the second grid structure.

* * * * *